United States Patent [19]

Maue et al.

[11] Patent Number: 5,735,705
[45] Date of Patent: Apr. 7, 1998

[54] DISCONNECTION PROTECTION DEVICE FOR AN ELECTRIC CONNECTION MEANS

[75] Inventors: Hans-Heinrich Maue, Bietigheim-Bissingen; Wolfgang Pade, Illingen; Eberhard Spengler, Markgroeningen; Dirk Langenhan, Schwieberdingen, all of Germany

[73] Assignee: Robert Bosch GmbH, Stuttgart, Germany

[21] Appl. No.: 647,138

[22] Filed: May 9, 1996

[30] Foreign Application Priority Data

May 24, 1995 [DE] Germany .......... 195 19 058.0

[51] Int. Cl.⁶ .......................................... H01R 13/62
[52] U.S. Cl. .............................. 439/372; 439/329
[58] Field of Search .................... 439/34, 130, 330, 439/331, 345, 352, 341, 372, 373, 329

[56] References Cited

U.S. PATENT DOCUMENTS 3,719,917  3/1973  Fischer et al. .................... 439/329
4,952,160  8/1990  Olsen ............................... 439/373 X
5,174,293  12/1992  Hagiwara .......................... 439/373 X

FOREIGN PATENT DOCUMENTS 0194825   3/1986  European Pat. Off. .
4100112C1 1/1991  Germany .
2229048   2/1989  United Kingdom .

Primary Examiner—Khiem Nguyen
Attorney, Agent, or Firm—Michael J. Striker

[57] ABSTRACT

The disconnection protecting device (12) for an electrical connector prevents or makes difficult manipulation of the electrical connector (11) to by-pass an automatic stopping device of a motor vehicle. The disconnection protecting device (12) includes a lock member (32) which can at least indirectly lock the assembled electrical connector (11) preventing its disassembly. The lock member (32) can be a retaining member (18) at least partially covering the electrical connector (11) or a locking element (33) inserted directly in the electrical connector (11) in the form of a plug lock or clip lock.

4 Claims, 2 Drawing Sheets

DISCONNECTION PROTECTION DEVICE FOR AN ELECTRIC CONNECTION MEANS

BACKGROUND OF THE INVENTION

The present invention relates to an electrical connection means and, more particularly, an electrical connection means having a disconnection protecting device.

An electrical connection means is known including a plug, a counter plug connected with it and a disconnection protecting device which has an unlocked configuration in which the plug may be connected or disconnected from the counter plug and a locked configuration in which the plug cannot be disconnected from the counter plug connected with it.

A disconnection protecting device for an electrical connection means is described in German Published Patent DE 41 00 112 C1. This disconnection protecting device prevents the release of the plug from the counter plug connected with it. This disconnection protecting device contains generally accessible elastic interlocking elements mounted in the plug, such as springs or hooks, which lock behind lock elements in the counter plug during connection of the plug with the counter plug to form the assembled electrical connection means.

This type of disconnection protection device does of course prevent an unintentional separation of the connection between the plug and the counter plug of the electrical connection means. However it is not suitable for an electrical connection means which is part of an automatic stopping device for a motor vehicle. If the counter plug, e.g., is formed as a terminal strip of a control device and the control device is put out of service by the automatic stopping device, then the disconnection protection device cannot prevent the electrical connection means from inadvertent unauthorized opening and the blocked control device can be replaced by a manipulated control unit by-passing the automatic stopping device. This however must be prevented by the disconnection protecting device.

SUMMARY OF THE INVENTION

It is an object of the present invention to provide a disconnection protecting device for an electrical connection means comprising a plug and a counter plug connectable with the plug which does not have the above-described disadvantage.

This object and others which will be made more apparent hereinafter is attained in a disconnection protecting device for an electrical connection means according to the invention including means for allowing connection and disconnection of the plug from the counter plug in an unlocked configuration thereof and, in a locked configuration, means for locking the plug together with the counter plug in the connected state of the electrical connection means so that the plug cannot be disconnected from the counter plug.

According to the invention the means for locking the plug together with the counter plug comprises a lock member at least indirectly locking the electrical connection means in the assembled or connected state in which the plug is connected with the counter plug.

The disconnection protecting device according to the invention has the advantage that the above-mentioned disadvantage is avoided. Moreover the disconnection protecting device has a lock member which effectively prevents a replacement or exchange of parts of the electrical connection means and at least indirectly secures the locked configuration of the electrical connection means.

Other embodiments of the invention are provided.

It is particularly advantageous when this plug disconnection device is used in an electrical automatic stopping device for a motor vehicle and thus manipulation of the automatic stopping device via the electrical connection means is effectively prevented.

In one embodiment the means for locking the plug together with the counter plug in the locked configuration includes means for at least partially enclosing the electrical connection means and the means for at least partially enclosing the electrical connection means is fixed to a supporting plate rigidly mounted in the motor vehicle. The means for at least partially enclosing the electrical connection means advantageously comprises a two-piece retaining member partially covering the electrical connection means. Alternatively, the means for at least partially enclosing the electrical connection means comprises a covering cap substantially covering the electrical connection means. The means for at least partially enclosing the electrical connection means can comprise a solid body made from a hard material, advantageously cast steel, and the solid body has a constant housing-side wall thickness.

In another embodiment of the invention the means for locking the plug together with the counter plug in the locked configuration comprises a locking element insertable and lockable in a throughgoing passage passing through both plate-like extensions of the counter plug and separating walls of the plug in the electrical connection means when the plug is connected to the counter plug in the assembled state. Advantageously the lock member can be a plug lock and includes the locking element which is a pin-shaped element.

In an alternative embodiment the means for locking the plug together with the counter plug in the assembled state of the electrical connection means comprises first tabs formed on the plug, second tabs formed on the counter plug and displaced from the first tabs in a connecting direction of the counter plug in the plug when the plug is connected to the counter plug to form and bound a passage and a locking element insertable and lockable in the passage. The lock member can be a clip lock including the locking element and the locking element is a U-shaped clip.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
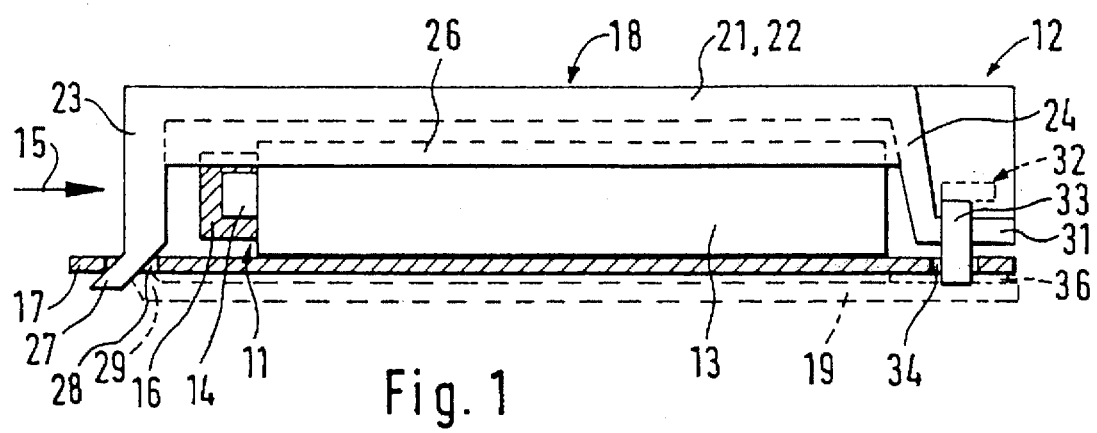
FIG. 1 is a side view of an electrical connection means with a first embodiment of a disconnection protection device according to the invention.
Figure 2:
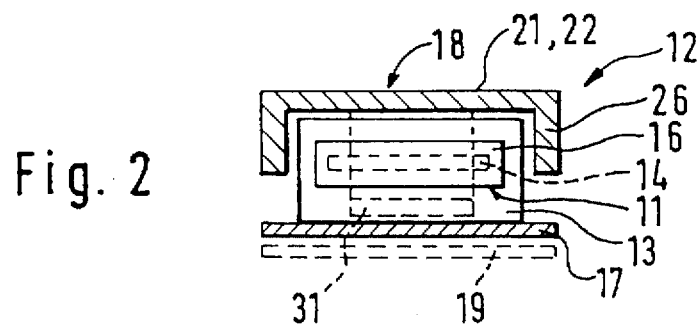
FIG. 2 is a cross-sectional view through the device shown in FIG. 1.

FIGS. 1 and 2 schematically show a first embodiment of a plug device 11 with a disconnection protecting device according to the invention which is part of an automatic stopping device for a motor vehicle.

The plug device comprises a plug 14 consisting of a terminal strip mounted on a control device 13 and a counter plug 16, for example in the form of a wiring harness connector, connectable in the connection direction of the plug device along an arrow 15. The control device 13 is attached with an unshown means to a supporting plate 17 rigidly mounted in the motor vehicle. The basically box-shaped assembled plug device 11 is enclosed by the disconnection protection device 12 partially covering it.

The disconnection protection device 12 comprises a two-piece retaining member 18 with an upper element 21 and a lower element 19. The rectangular lower element 19 extends under the plug device 11 and is separated from it by the base element 13. The upper element 21 has a rectangular cover wall 22, on whose smaller ends or sides a first end wall 23 and a second end wall 24 are provided respectively which are both dimensioned so that they project somewhat beyond the vertical extent of the control device 13 and the dimensions of the assembled socket device 11.

In the same way side walls 26 are arranged on the long sides of the cover wall 22, whose heights correspond approximately to half the height of the control device 13 and are oriented in the same way relative to the end walls 23, 24.

The upper element 21 with its end walls 23, 24 and side walls 26 aligned with the lower element 19 is placed over the plug device 11 to assemble the two-piece retaining member 18. A first joint part 27 on an end of the first end wall 23 pointing away from the cover wall 22 engages through a first opening 28 provided in the supporting plate 17 to form a fixed joint in a complimentary second joint part 29.

A lock member 32 is installed on a flange 31 which protrudes from the free end of the second end wall 24 on the end or edge furthest from the control device 13. The lock member 32 and connected locking element 33 engage with the locking plate 36 of the lower element 19 located under a second opening 34 in the support plate 17 to form a fixed connection.

The retaining member 18 assembled in this way forms the disconnection protection device 12, which at least indirectly closely surrounds the plug device 11 so that the plug 14 cannot be separated from the counter plug 11 in this closed position of the disconnection protection device 12. That is however possible when the lock member 32 is opened and the upper element 21 is pivoted on the pivot parts 27,29 far enough so that the counter plug 11 can be pulled from the plug 14 with the disconnection protection device 12 in its released or open configuration.

Alternatively the upper element 21 of the retaining member 18 can be replaced by a covering cap, which largely covers the plug device 11.

In both cases the disconnection protection device 12 is provided as a solid body, advantageously provided with a constant housing-side wall thickness, which is made from a hard material, advantageously cast steel.

The first embodiment shown in FIGS. 1 and 2 thus includes a disconnection protection device 12 which cannot be overcome and which does not allow then a by-passing of the automatic stopping device by separation of the plug from the counter plug in the plug device 11. Rapid replacement of the control device 13 is however not possible.

Figure 3:
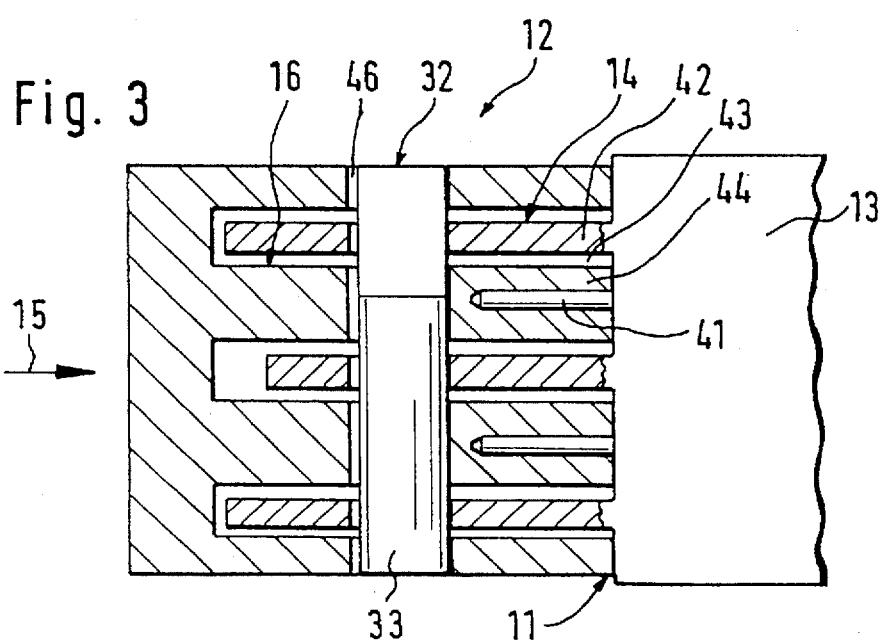
FIG. 3 is a schematic view of a second embodiment according to the invention.

FIG. 3 shows a second embodiment of the disconnection protection device 12 of the assembled plug device 11 schematically. Contact elements 41 mounted rigidly in the plug 14 on the control device 13 like a terminal strip are shown. These contact elements 41 are arranged in two rows on the control device 13. Each of the rows of contact elements 41 is bounded by a separating wall 42 fixed to the plug 14.

Plate-like extensions 44 of the counter plug 16 formed like a wiring harness plug extend into the intervening spaces 43 between the separating walls 42 of the plug 14. Unshown matching contact elements, which are fixed component parts of the counter plug 16, are embedded in these plate-like extensions 44 and contact with the associated contact elements 41.

The separating walls 42 and the plate-like extensions 44 are provided with a transverse common throughgoing passage 46 in a region free of contact elements 41 and the unshown matching contact elements. A lock member 32, which is formed here as a plug lock with a pin-like locking element 33 advantageously made from steel is inserted in this throughgoing passage 46. The lock member 32 together with the throughgoing passage 46 in the separating walls 42 and the plate-like extensions 44 form the disconnection protecting device 12 for the plug device 11 seen in FIG. 3 in its locked configuration.

Figure 4:
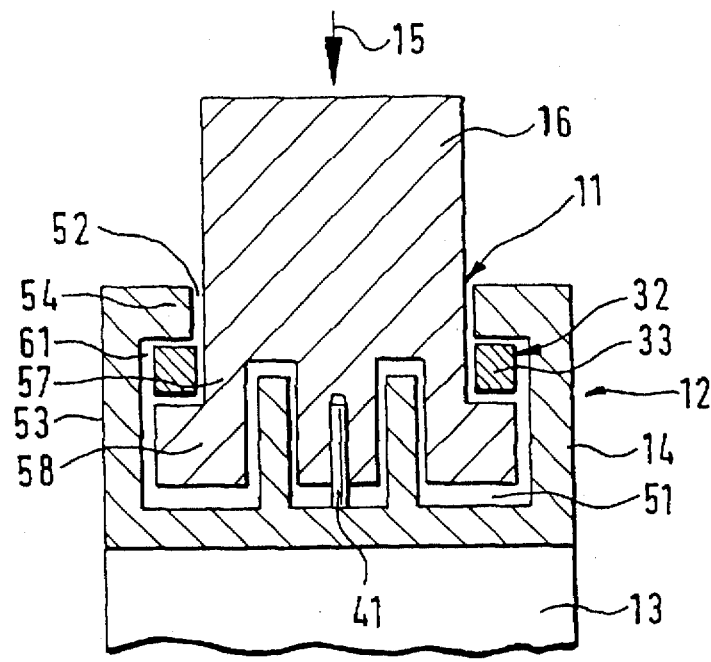
FIG. 4 is a cross-sectional view through an electrical connection means having a third embodiment of a disconnection protection device according to the invention.
Figure 5:
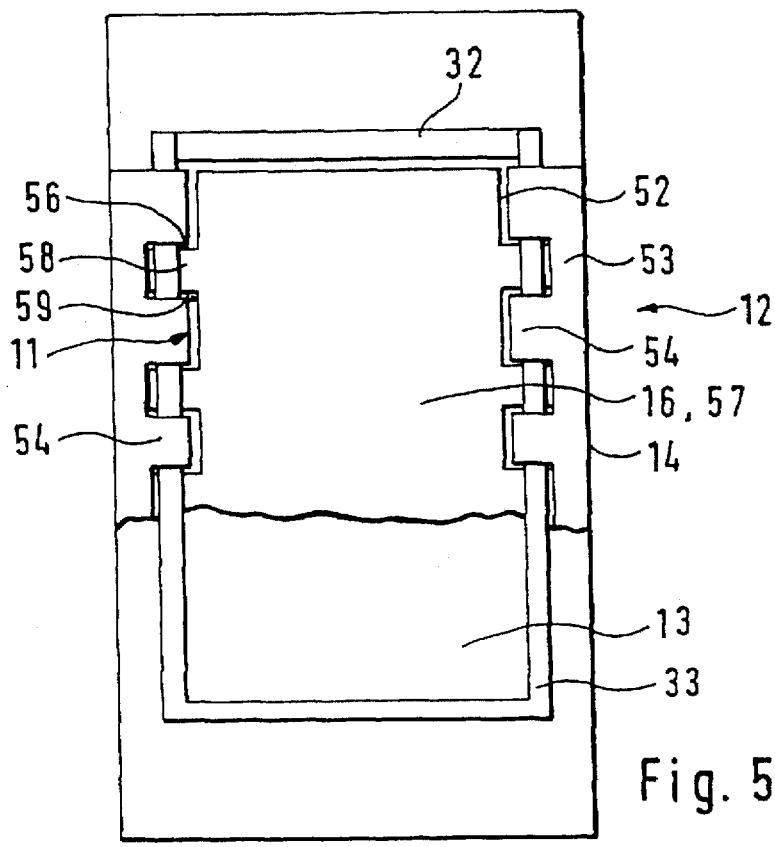
FIG. 5 is a cutaway plan view of the device shown in FIG. 4.

A third embodiment of the disconnection protecting device 12 of the assembled electrical connection means device is shown in schematic form in FIGS. 4 and 5. A receptacle 51 for the counter plug 16 is formed in the plug 14. The plug 14 is provided as a terminal strip fixed to the control device 13. First opposing rectangular tabs 54 are provided in two opposing parallel side walls 53 of the receptacle 51 at its opening or mouth 52. The first tabs 54 on each of the walls 53 are separated from each other by rectangular first recesses 56 which have a somewhat greater cross-sectional area than that of the first tabs 54.

In a similar way second tabs 58 and second recesses 59 are arranged in a housing-side wall 57 of the counter plug 16 in the portion of the counter plug 16 inserted into the plug 14 so that on assembly of the electrical connection means 11 the first tabs 54 of the plug 14 pass through the second recesses 59 and the second tabs 58 pass through the first recesses 56 of the plug 14 and can travel further into the receptacle 51.

The assembly of the electrical connection means 11 is complete, when, as shown in FIG. 4, a passage 61 with a square cross-section is formed along the wall 53 between adjacent tabs 54,58 of the plug 14 and the counter plug 16. A lock member 32, which here is formed like a clip lock, comprises a locking element 33 which is a U-shaped clip and made from hardened steel, which is inserted in this passage 61 to lock the connection means 11. The disconnection protecting device 12 for the plug device 11 in the locked configuration comprises the lock member 32 together with the tabs 54,58 bounding the passage 61 in the insertion or connection direction shown by arrow 15.

In both the second and third embodiments on breaking of the protecting device 12 and separation of the parts of the plug device 11 the contact elements 41 and the unshown opposing contact elements are unusable because of the required force and the connection of the counter plug 16 with the plug 14 of a prepared control device 13 putting the automatic stopping device out of action is no longer possible.

All embodiments of the disconnection protecting device 12 provide effective means for preventing manipulation of the automatic stopping device by preventing accessibility to the plug device 11 and the control unit 13.

While the invention has been illustrated and described as embodied in a disconnection protecting device for an electrical connection means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A disconnection protecting device for an electrical connection means (11) of an electrical automatic stopping device for a motor vehicle, wherein said electrical connection means (11) comprises a plug (14) and a counter plug (16) connectable with said plug (14), and said disconnection protecting device (12) includes, in a locked configuration thereof, means for locking said plug (14) together with said counter plug (16) in an assembled state of the electrical connection means (11) in which said plug (14) is connected with said counter plug (16) so that said plug (14) cannot be disconnected from said counter plug (16), and said means for locking said plug (14) together with said counter plug (16) in said assembled state of the electrical connection means (11) comprises a lock member (32) at least indirectly fastening said plug (14) together with said counter plug (16), wherein the counter plug (16) has plate-like extensions (44) and the plug (14) has separating walls (42) engaged with the plate-like extensions (44) in the assembled state of the electrical connection means (11) and wherein said means for locking said plug (14) together with said counter plug (16) in the assembled state of the electrical connection means (11) comprises a locking element (33) insertable and lockable in a throughgoing passage (46) passing through both said plate-like extensions (44) of the counter plug (16) and said separating walls (42) of the plug (14) in the assembled state of the electrical connection means (11) when the plug (14) is connected to the counter plug (16).

2. The disconnection protection device as defined in claim 1, wherein said lock member (32) is a plug lock and includes said locking element (33) and said locking element (33) comprises a pin-shaped element.

3. A disconnection protecting device for an electrical connection means (11) of an electrical automatic stopping device for a motor vehicle, wherein said electrical connection means (11) comprises a plug (14) and a counter plug (16) connectable with said plug (14), and said disconnection protecting device (12) includes, in a locked configuration thereof, means for locking said plug (14) together with said counter plug (16) in an assembled state of the electrical connection means (11) in which said plug (14) is connected with said counter plug (16) so that said plug (14) cannot be disconnected from said counter plug (16), and said means for locking said plug (14) together with said counter plug (16) in said assembled state of the electrical connection means (11) comprises a lock member (32) at least indirectly fastening said plug (14) together with said counter plug (16), wherein the means for locking said plug (14) together with said counter plug (16) in the assembled state of the electrical connection means (11) comprises first tabs (54) formed on the plug (14), second tabs (58) formed on the counter plug (16) and displaced from the first tabs (54) in a connecting direction of the counter plug (16) with the plug (14) in said assembled state, said first tabs (54) and said second tabs (58) bounding a passage in the plug (14) in the assembled state of the electrical connection means (11), and a locking element (33) insertable and lockable in the passage (61).

4. The disconnection protection device as defined in claim 3, wherein said lock member (32) comprises a clip lock including said locking element (31) and said locking element (31) is a U-shaped clip.

* * * * *